Figure 1:
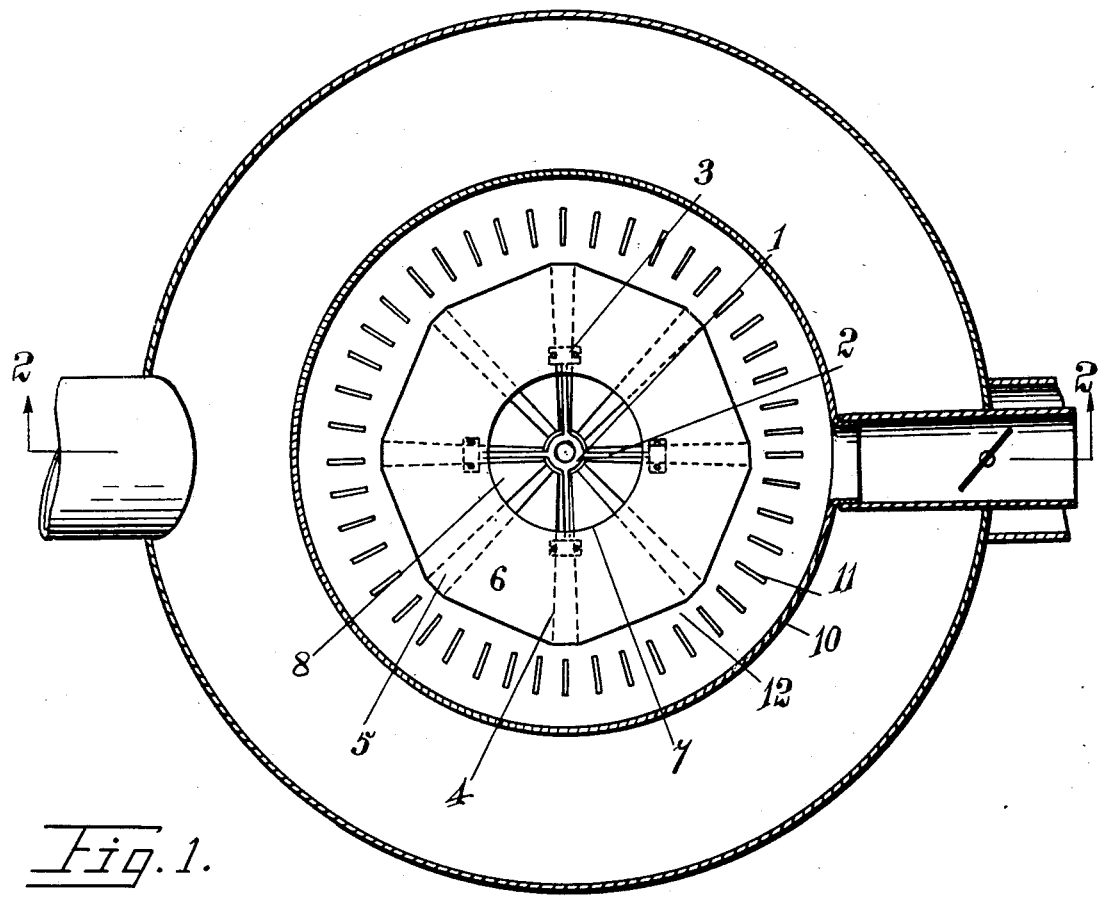

June 12, 1928. 1,673,073
G. T. HOUGHTBY
CENTRIFUGAL FAN
Filed Aug. 22, 1927 2 Sheets-Sheet 1

Inventor
George T. Houghtby

June 12, 1928.  
G. T. HOUGHTBY  
CENTRIFUGAL FAN  
Filed Aug. 22, 1927  
1,673,073  
2 Sheets-Sheet 2
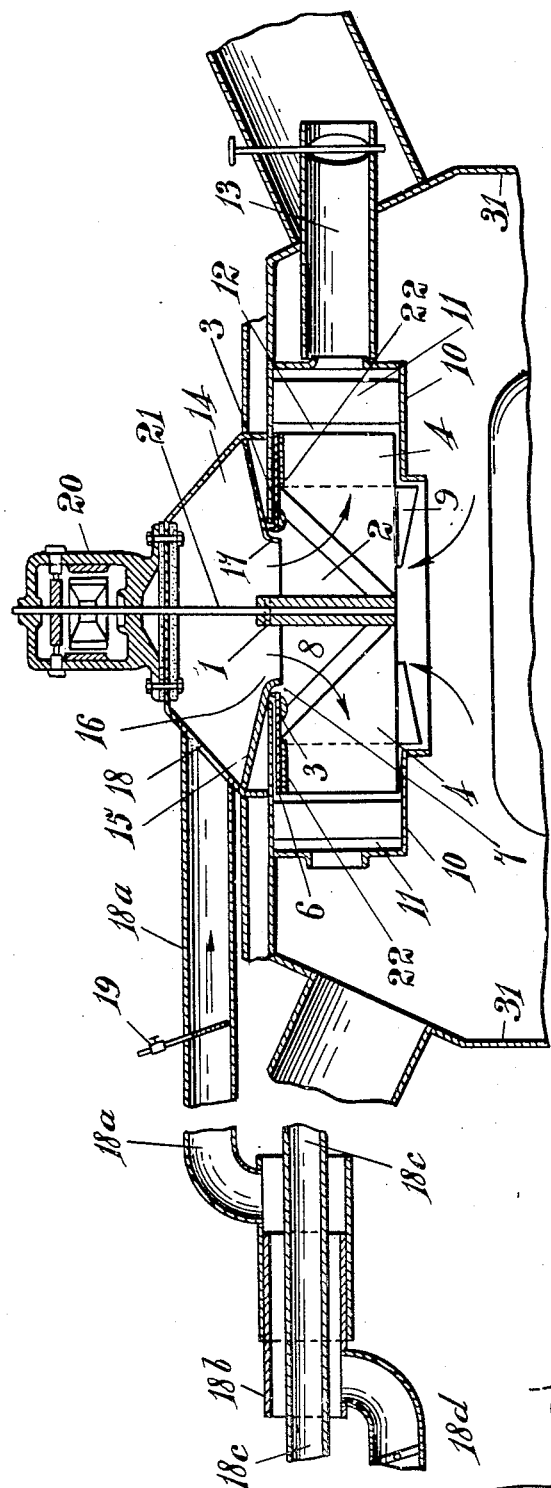
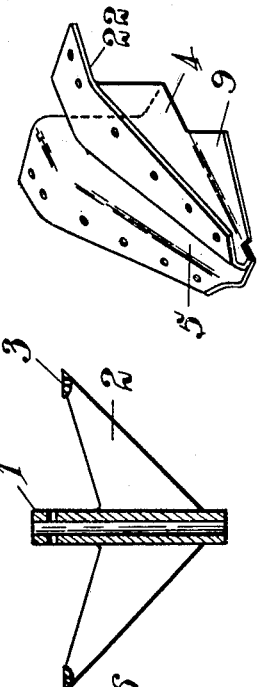
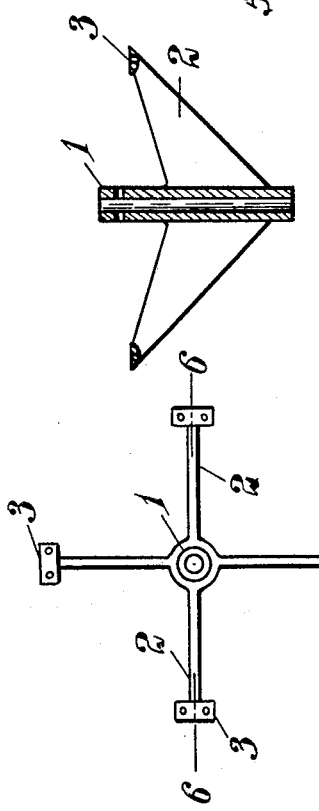

Patented June 12, 1928.

1,673,073

UNITED STATES PATENT OFFICE.

GEORGE TITUS HOUGHTBY, OF LONDON, ONTARIO, CANADA.

CENTRIFUGAL FAN.

Application filed August 22, 1927. Serial No. 214,545.

Centrifugal fans may be classified as those having straight radial blades and those having blades curved in relation to the direction of revolution, and in these fans a single rotating air current is created by the rotor which is partially obstructed to develop static pressure and convert it into kinetic energy when expelled through the discharge outlet or outlets.

According to my present invention the fan is designed to simultaneously create two rotating air currents each separate and distinct from the other, combine them into a single current beyond the rotational path of the rotor, and build up the pressure to produce the necessary kinetic energy for carrying the air to its destination through the duct or ducts connected with the discharge outlet.

In one embodiment of the invention the rotor comprises a central hub and a set of hollow or tubular blades rotatable with the hub. The inner ends of these blades are bevelled or chisel shaped and are assembled, after the manner of the spokes of a wheel, to form at one side of the rotor a conoidal recess around the hub. The bores or channels through the blades are open at both ends and communicate at their inner ends with this recess and at their outer ends with the fan chamber or area beyond the perimeter of the rotor. The hub is provided with a set of web-shaped vanes or arms which extend radially into the conoidal recess and form a fan for creating a rotating air current in it during the revolution of the rotor. Flanges extend laterally from the upper edges of the sides of each blade and flanges of adjacent blades are riveted, welded or otherwise secured together to form a diaphragm which connects and braces the blades and separates the air currents at one side of the rotor from the air currents at the other side. An annular plate or ring overlies and is secured to the top of the hollow blades and to the web shaped vanes for securing them together and ensuring their united rotation, and this annular plate or ring is formed with a central orifice co-axial with the conoidal recesses. At one side of the diaphragm, the vanes create a current in the conoidal recess and expel it through the hollow blades and at the other side the blades create a current which is separate from that in the recess until the two currents are expelled beyond the rotational path of the rotor. Deflectors or obstructions are arranged beyond the perimeter of the rotor for retarding the rotation of one or both the air currents and causing the pressure to build up as the rotor revolves.

A forced air heating system includes a fan for increasing the volume of air passed over the heating surfaces of the furnace and delivered to the outlets, and when the device forming the subject-matter of this invention is used in a system of this kind the rotor is installed in a fan chamber with the blades at one side of the diaphragm operating to establish an uniform flow of air from the main inlet to the outlet or outlets, and the vanes or arms in the conoidal recess at the other side of the diaphragm operating to draw a current of air into the recess and expel it through the hollow or tubular blades to the perimeter of the rotor where it combines with the air expelled by the blades.

Figures 3, 4:
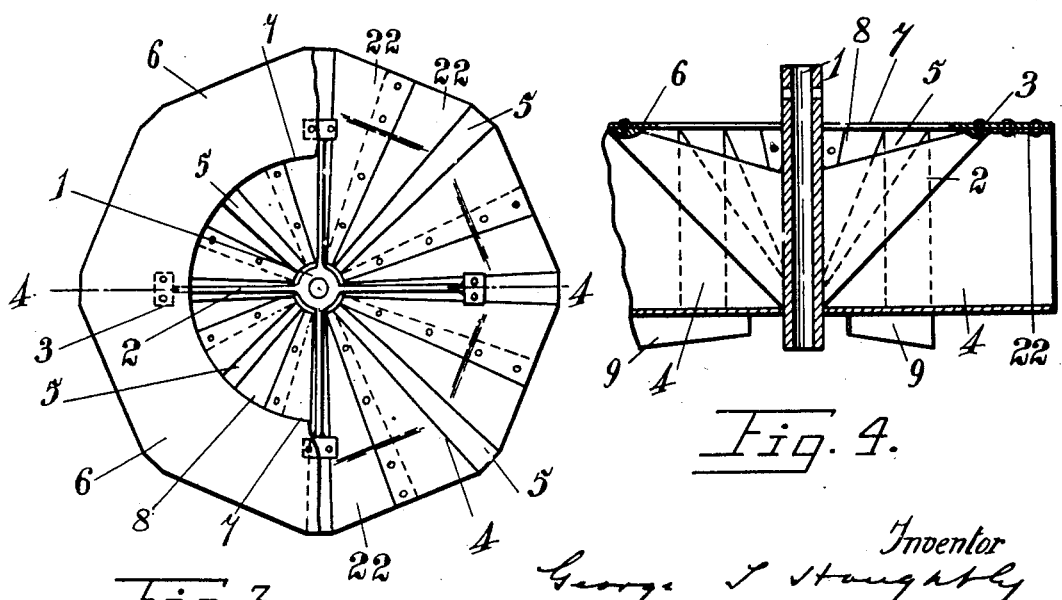

For an understanding of the invention reference is to be had to the following description and to the accompanying drawings, in which:

Fig. 1 is a sectional plan view of a furnace,

Fig. 2 is a vertical section of the upper part of the furnace, on the line 2—2, Fig. 1, Fig. 3 is a plan view of the rotor partly in section on a larger scale than Figs. 1 and 2, Fig. 4 is a vertical section on the line 4—4, Fig. 3, Fig. 5 is a plan view of the fan hub, Fig. 6 is a vertical section on the line 6—6, Fig. 5, and Fig. 7 is a perspective view of one of the fan blades.

Like numerals of reference refer to like parts throughout the specification and drawings.

The device illustrated in the drawings and hereinafter described, when used with forced air heating apparatus, may be installed in the furnace or any other part of the system to establish an accelerated flow of air over the heating surfaces of the furnace and thus increase the heat convection, combine it with a supplemental current of air, and maintain a positive flow and a correct distribution of the air to the outlet or outlets. It is not intended, however, that the use of the invention should be confined to forced air heating systems as the device can be used for other purposes and the following description is merely explanatory of the structural details of the preferred embodiment of the invention and one of the uses for which it can be employed.

The rotor comprises a hub and a set of blades 4 connected to and extending radially from the hub. The hub as shown in Figs. 5 and 6, consists of a sleeve 1 provided with four web-shaped arms 2 extending radially from the sleeve and a lug 3 at the outer end of each arm. Each blade 4 is of a hollow or tubular formation, its bore 5 is open at both ends for the circulation of the air through the blade and the inner end of each blade is bevelled or chisel shaped. The blades are assembled with the hub, after the manner of the spokes of a wheel, as shown in Fig. 3, and in this assembly the bevelled or chisel-shaped ends of the blades abut around the central sleeve 1 and form a conoidal recess 8, the inner end of the bore 5 of each blade communicates with it, and the web-shaped arms 2 extend from the sleeve across the recess. Flanges 22 extend laterally from the upper edges at both sides of each blade, and the oppositely projecting flanges of adjacent blades are riveted, welded or otherwise secured together and form a diaphragm which separates the air currents at one side of the rotor from the air currents at the other side. An annular plate or ring 6 overlies the blades 4 and is secured to them and to the lugs 3 and this plate or ring is formed with a central aperture or orifice 7 overlying and of corresponding area to the conoidal recess 8. At the lower edge of each blade 4 is a curved or inclined flange 9 extending radially from the sleeve, part way to the periphery of the rotor and laterally from the lower edge of the blade, for the purpose of effecting an uplift of the air into the path of the blade during its revolution. The rotor is mounted in a fan housing or casing 10 provided with a plurality of deflectors 11 radially arranged around the fan chamber 12, for retarding the rotation of the air during the revolution of the rotor and causing the pressure in the fan chamber to build up as the rotor revolves and these deflectors cause the two air currents to mix when expelled beyond the periphery of the rotor.

The fan housing or casing 10 contains two chambers 12 and 14 and the rotor revolves in the chamber 12. The chamber 14 is above the chamber 12 and has a sloping bottom 15 formed with a central aperture 16 and a downturned flange 17 entered through the central aperture in the plate or ring 6. The chamber 14 has an inlet 18 from which the air circulates to the aperture 16 and the recess 8 and this inlet is connected by a pipe 18$^a$ with a drum or heater 18$^b$ surrounding the smoke pipe 18$^c$ and is provided with a balanced damper 19 which automatically opens under the pressure of the inflowing air during the revolution of the rotor and automatically closes when the rotor ceases to revolve. A motor 20 is mounted on the top of the housing or casing 10 and the motor shaft 21 extends into and is connected with the sleeve 1.

The blades 4 create a rotating current of air at one side of the diaphragm and the web-shaped arms 2 create a rotating current of air at the other side. The deflectors 11 retard the rotation of one or both of these currents and develop pressure within the fan chamber and kinetic energy or potential pressure at the discharge outlet 13. The revolution of the web-shaped arms 2 creates a rotating current within the conoidal recess 8 and forces it through the bores of the tubular blades 4 and discharges it at the perimeter of the rotor where it combines with the air expelled by the blades at the other side of the diaphragm. The fan thus creates one current which establishes an accelerated flow of air over the heating surfaces of the furnace for increasing the heat convection and simultaneously creates a second current which combines with the first mentioned current and increases the volume of air at the register.

Having thus fully described my invention what I claim as new and desire to secure by Letters Patent is:

1. In a centrifugal fan, a rotor comprising a set of hollow blades for creating a rotating air current at one side of the rotor and a set of vanes for creating an air current at the other side of the rotor, and expelling it through the hollow blades to combine with the first-mentioned air current.

2. In a centrifugal fan a rotor comprising a central hub, a set of hollow blades open at both ends and shaped at their inner ends to form a recess around the hub, a set of vanes extending radially from the hub into the recess and a diaphragm separating the air currents at the two sides of the rotor, the blades creating at one side of the diaphragm an air current and expelling it beyond the perimeter of the rotor, and the vanes creating at the other side of the diaphragm an air current in the recess and expelling it through the hollow blades to combine with the air current expelled by the blades.

3. In a centrifugal fan a rotor comprising a central hub, a set of hollow blades open at both ends and shaped at their inner ends to form a recess around the hub, a set of vanes extending radially from the hub into the recess and a diaphragm separating the air currents at the two sides of the rotor, the blades creating at one side of the diaphragm an air current and expelling it beyond the perimeter of the rotor, and the vanes creating at the other side of the diaphragm an air current in the recess and expelling it through the hollow blades to combine with the air current expelled by the blades, and deflectors for retarding the rotation of the air and causing the pressure to build up as the rotor revolves.

4. A centrifugal fan as claimed in claim 1 in which the bottom edge of each blade is provided with a laterally extending flange for effecting an uplift of the air into the path of the blade during the revolution of the rotor.

5. A centrifugal fan as claimed in claim 2 in which the rotor is enclosed in a housing comprising two chambers in one of which the rotor revolves and the other of which is above the first-mentioned chamber for an auxiliary air supply which is expelled through the recess and hollow blades.

6. A centrifugal fan as claimed in claim 2 in which the rotor is enclosed in a housing comprising two chambers in one of which the rotor revolves and the other of which is above the first mentioned chamber and has a sloping bottom formed with a central aperture communicating with the recess.

Dated at the city of London, in the county of Middlesex, and Province of Ontario, Dominion of Canada, this 13th day of August, A. D. 1927.

GEORGE TITUS HOUGHTBY.